Patented Apr. 8, 1947

2,418,583

UNITED STATES PATENT OFFICE 2,418,583

ETHYL CELLULOSE GELS AND THE METHOD OF PREPARING SAME

Mortimer T. Harvey, South Orange, N. J., assignor to Harvel Research Corporation, a corporation of New Jersey No Drawing. Application August 26, 1944, Serial No. 551,446

4 Claims. (Cl. 106—173)

This invention relates to ethyl cellulose gels and to methods for making the same. More particularly this invention is directed to novel gels and to methods for making the same. In one of its more specific aspects this invention is directed to gels of solid ethyl cellulose and the products produced by "blowing" the alkyl esters of abietic acid and to the methods for making said gels.

In the course of my experimentations with gels, I have found that gels could be produced with ethyl cellulose and the "blown" products of the alkyl esters of abietic acid and further that for certain purposes these novel gels are far superior to those gels produced with ethyl cellulose and the untreated alkyl esters of abietic acid. Among some of the advantages of my novel combination when compared with a combination of ethyl cellulose and untreated alkyl esters of abietic acid are: (1) higher tensile strength, (2) higher dielectric strength, (3) higher dryness characteristic, lower petroleum solvents characteristic, and so forth.

The methods for preparing said products produced by "blowing" alkyl esters of abietic acid are specifically set forth in my copending application Ser. No. 522,156 filed February 12, 1944. The entire subject matter of said copending application is hereby included herein and made part hereof.

As set forth in said application, an alkyl ester of abietic acid containing between 1 to 4 carbon atoms in the alkyl group, such as methyl abietate, ethyl abietate, propyl abietate and butyl abietate, is blown with a free oxygen containing gas until the viscosity of the resultant product at 25° C. is at least 50% greater than the viscosity at 25° C. of the untreated alkyl abietate.

These "blown" products may be produced by agitating one or a mixture of two or more of said esters maintained at an elevated temperature materially above room temperature and in the presence of a gas containing free oxygen, and the agitation is continued until the viscosity at 25° C. of the material being treated is at least 50% greater than the viscosity at 25° C. of the untreated material and the combined oxygen content of the treated material is at least 0.5% greater than the percentage of combined oxygen of the untreated material. In addition to these characteristics, the specific gravity of the treated material is higher than the specific gravity of the untreated material, the treated material has a lower solubility in mineral spirits when compared with the corresponding characteristic of the untreated material and the index of refraction of the treated material is greater than the index of refraction of the untreated material. In carrying out this process I prefer that the temperature of the ester subjected to said free oxygen containing gas be above about 140° F. Although temperatures greatly in excess of 140° F. may be employed, I prefer to employ a temperature range of between about 140° F. to 400° F. notwithstanding that temperatures in excess of 400° F. such as 600° F. may be employed. While a wide variety of gases containing free oxygen may be employed, for the purposes of illustration, I disclose the use of air, oxygen or ozone, the former being the most preferable because of its availability and low cost. The agitation of the ester may be accomplished by flowing the material, by projecting the material or by forcing the gas itself through the material being treated.

These methods may be practiced at atmospheric or above atmospheric pressures. These specific methods are set forth merely for the purposes of illustration and show that variations of these particular methods may be used to obtain agitation and a high degree of surface contact of the abietate being treated with said gas so that the time of treatment may be such as to make the process commercially practicable. While the time of treatment is a variable depending upon the temperature of the ester being treated and the degree of surface contact of the ester and said gas per unit time, I prefer that the temperature of the ester be maintained above about 140° F. and the ester be treated with the free oxygen containing gas until the viscosity at 25° C. of the novel product be at least 50% greater than the viscosity at 25° C. of the untreated ester, that its percentage of combined oxygen be at least 0.5% greater than the percentage combined oxygen of the untreated ester, that the specific gravity of the novel product be 0.2% greater than the specific gravity of the untreated ester and that its solubility in mineral spirits to cloudiness be less than 75% of the solubility in mineral spirits to cloudiness of the untreated ester and that its index of refraction be greater than that of the untreated ester.

Briefly, the novel compositions produced according to this invention comprise ethyl cellulose and one or more of the products obtained by heating above about 140° F. and preferably between 140° F. and 400° F. a mass of an alkyl ester of abietic acid having between 1 to 4 carbon atoms in the alkyl group and while in said heated condition agitating said mass in the presence of a free oxygen containing gas until the viscosity of said mass at 25° C. has increased at least 50%, and preferably at least 100%. The ratio of the ethyl cellulose to said products thus obtained may vary over very wide limits depending upon the type of gel desired. Generally, the stiffness or rigidity of the gel may be controlled by varying this ratio, and the stiffness and rigidity characteristic is directly proportional to this ratio, i. e. the higher this ratio the stiffer and more rigid the gel. Thus very rigid and stiff compositions of matter as well as soft and pliant compositions of matter may be produced.

These novel compositions either with or without other substances added thereto may be produced by the following general process: there is provided in a vessel a mixture of a quantity of ethyl cellulose and a quantity of a product obtained by heating above about 140° F. and preferably between about 140° F. and about 400° F. a mass of an alkyl ester of abietic acid having between 1 and 4 carbon atoms in the alkyl group and while in said heated condition agitating said mass in the presence of free oxygen containing gas until the viscosity of said mass has increased at least 50% at 25° C. This mixture is heated, preferably between about 250° F. and 400° F. until the mixture is converted to a solution caused by the dispersion or solution of the ethel cellulose in said product. Then the solution is allowed to cool in shallow pans to room temperature, when it is in the state of a gel. The ethyl cellulose that I prefer to employ in the production of these gels is one or a mixture of two or more of those in a fine powdered condition and having an ethoxy content between about 44% and 50%. The ratio of the ethyl cellulose to the product obtained by treating said abietates in the aforedescribed manner may be between about 2 to 1 and 1 to 25 by weight in said gels.

The various novel compositions thus obtained may be employed for a number of different purposes among which are (a) as adhesives, (b) as a coating and/or impregnating material for paper, fabric, wood, metal and the like, (c) for extruded products, (d) calendered stock finding particular application as a substitute covering material such as shoe leather and the like, (e) in printing inks, (f) as a varnish type base, (g) in combination with a rubbery copolymer known as "Buna-S" and being a copolymer of butadiene and styrene, (h) in combination with a rubbery copolymer known as "Buna-N" and being a rubbery copolymer of butadiene and acrylonitrile, and (i) in combination with natural or reclaimed rubber.

*Example 1*

A quantity of one of said alkyl esters of abietic acid having between 1 to 4 carbon atoms in the alkyl group is placed into a closed container having a conduit extending through the top thereof and terminating at a point spaced from but near the bottom thereof. The lower end of said conduit has a plurality of lateral openings therethrough, through which a free oxygen containing gas, such as air, oxygen or ozone may be discharged into said ester at places below the upper surfaces of said ester. The container has a vent located near the top thereof to release gas and is used to prevent great pressure being built up in said container and to allow the air, oxygen or ozone to circulate through said liquid. A stirrer is employed to constantly agitate said liquid throughout the entire operation thereby to increase the contact of the liquid ester with the air, oxygen or ozone. Throughout the entire operation, the liquid ester is maintained at a temperature between about 140° F. and 400° F., while the air, oxygen or ozone, admitted to said container may be at room temperature. The quantity of liquid ester in the container may be about one-quarter of the capacity thereof in order to accommodate the great deal of splashing due to the bubbling of the air, oxygen or ozone therethrough and the agitation due to stirring. After a period of between about 24 to 144 hours, depending upon the rate of stirring, the rate of air, oxygen or ozone admission and the quantity of said ester, the resultant product will be found to have increased in specific gravity, viscosity and combined oxygen content when compared with the respective corresponding characteristics of the ester before said operation was begun. After 144 hours the combined oxygen content will have increased at least 1% and in some cases will have increased as high as about 5%, the viscosity at 25° C. will have increased at least 50% and in some cases will have increased to such a degree that it has been converted to a mass which is semi-solid at 25° C.

*Example 2*

A specific example of some of my novel products may be obtained by employing methyl abietate at a temperature of about 300° F. to 310° F. and allowing the methyl abietate maintained at this temperature to flow or cascade over a series of angularly disposed plates or pans with air being moved over the flowing abietate in a counter-current direction. The following table shows the characteristics of the products produced at different intervals of this particular blowing operation.

| Product | No. of hours at 305° F. Methyl ester allowed to flow over series of pans with air in counter-current flow | Viscosity at 25° C. | Viscosity at 25° C. Thinned with 25% Xylol | Specific Gravity | Solubility in mineral spirits to cloudiness in grams | Index of Refraction |
|---|---|---|---|---|---|---|
| | | | Cp. | | | |
| A | 0 | 2,500 cp | 40 | 1.03 | 20 to 1 | 1.528 |
| B | 10 | 5,300 cp | 50 | 1.035 | 8 to 1 | 1.530 |
| C | 20 | 21,000 cp | 60 | 1.04 | 4 to 1 | 1.531 |
| D | 30 | Too thick | 70 | 1.045 | 3 to 1 | 1.5325 |
| E | 40 | Too thick | 80 | 1.05 | 2.3 to 1 | 1.5335 |
| | 50 | Very heavy | 104 | 1.06 | 1.8 to 1 | 1.535 |

The following Examples 1–6 are illustrative examples of the methods which may be employed for obtaining the products produced by blowing said abietates:

The product produced at the end of this 50 hour treatment had a combined oxygen content of more than 3% greater than the corresponding characteristic of the methyl abietate.

Example 3

1000 parts of ethyl ester of abietic acid was placed in an autoclave. Oxygen was forced into said autoclave and the temperature of the ester was increased to 140° F. with the pressure within the autoclave maintained at about 30 to 40 pounds per square inch by virtue of the addition of the oxygen under pressure. This mass was stirred rapidly for 24 hours while at said temperature and pressure. The specific gravity at 25° C. of the resulting product increased to 1.08 and its viscosity at 25° C. was more than 100% above that of the original ester. This product is hereinafter known as product F.

Example 4

1000 grams of the methyl ester of abietic acid was heated to 180° F. and maintained at this temperature in closed vessel for 24 hours. During the entire period air was blown into said ester and the ester was stirred very rapidly. At the end of said 24 hour period, the finished product was approximately the same weight as the original material, was almost a semi-solid in consistency and had a specific gravity at 25° C. of about 1.09. This product is hereinafter known as product G.

Example 5

1000 grams of the propyl ester of abietic acid was heated to 180° F. and maintained at this temperature in a closed vessel for 24 hours. During this entire period air was blown into said ester and the ester was stirred very rapidly. At the end of said 24 hour period, the finished product was approximately the same weight as the original material, was almost a semi-solid in consistency and had a specific gravity at 25° C. of about 1.05. This product is hereinafter known as product H.

Example 6

1000 grams of the butyl ester of abietic acid was heated to 180° F. and maintained at this temperature in a closed vessel for 24 hours. During this entire period air was blown into said ester and the ester was stirred very rapidly. At the end of said 24 hour period, the finished product was approximately the same weight as the original material, was almost a semi-solid in consistency and had a specific gravity at 25° C. of about 1.05. This product is hereinafter known as product J.

The following Examples 7 to 16 are specific examples of particular gels which may be produced as well as specific methods for the production of these gels, all parts being given by weight. These examples are given merely to illustrate the invention and are not given in a limiting sense.

Example 7

Three parts of product A and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product A. Then this solution is poured into shallow iron pans about 3" deep and allowed to cool overnight at room temperature (70° F.). The next morning the mass at 70° F. in said pans will be a solid rubbery mass or gel.

Example 8

Four parts of product B and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product B. Then this solution is poured into shallow iron pans about 3" deep and allowed to cool overnight at room temperature (70° F.). The next morning the mass at 70° F. in said pans will be a solid rubbery mass or gel.

Example 9

Five parts of product C and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product C. Then this solution is poured into shallow iron pans about 3" deep and allowed to cool overnight at room temperature (70° F.). The next morning the mass at 70° F. in said pans will be a solid rubbery mass or gel.

Example 10

Six parts of product D and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product D. Then this solution is poured into shallow iron pans about 3" deep and allowed to cool overnight at room temperature (70° F.). The next morning the mass at 70° F. in said pans will be a solid rubbery mass or gel.

Example 11

Seven parts of product E and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product E. Then this solution is poured into shallow iron pans about 3" deep and allowed to cool overnight at room temperature (70° F.). The next morning the mass at 70° F. in said pans will be a solid rubbery mass or gel.

Example 12

Ten parts of product E and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product E. Then this solution is poured into shallow iron pans about 3" deep and allowed to cool overnight at room temperature (70° F.). The next morning the mass at 70° F. in said pans will be a solid rubbery mass or gel.

Example 13

Four parts of product F and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product F. Then this solution is poured into shallow iron pans about 3" deep and allowed to cool overnight at room temperature (70° F.). The next morning the mass at 70° F. in said pans will be a solid rubbery mass or gel.

*Example 14*

Four parts of product G and one part of ethyl cellulose (ethoxy content 44% to 50%) are mixed together in a vessel and heated between about 300° F. to about 325° F. and maintained at said temperature for about 3 to 4 hours or until the ethyl cellulose becomes dissolved or dispersed in product G. Then this solution is poured into shallow iron pans about 3" deep and allowed to cool overnight at room temperature (70° F.). The next morning the mass at 70° F. in said pans will be a solid rubbery mass or gel.

*Example 15*

Four parts of product H and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product H. Then this solution is poured into shallow iron pans about 3" deep and allowed to cool overnight at room temperature (70° F.). The next morning the mass at 70° F. in said pans will be a solid rubbery mass or gel.

*Example 16*

Four parts of product J and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product J. Then this solution is poured into shallow iron pans about 3" deep and allowed to cool overnight at room temperature (70° F.). The next morning the mass at 70° F. in said pans will be a solid rubbery mass or gel.

Novel and improved millable compositions and cured compositions are provided by employing the novel combination of (a) a rubbery substance selected from the group consisting of rubbery polymers of butadiene, solid rubbery copolymers of butadiene and acrylonitrile, which copolymers are commonly known as "Buna-N," natural and reclaimed rubber and (b) a gel of ethyl cellulose and a product produced by heating above about 140° F. and preferably between 140° F.–400° F. a mass of an alkyl ester of abietic acid having 1 to 4 carbon atoms in the alkyl group and while in said heated condition, agitating said mass in the presence of a free oxygen containing gas until the viscosity of said mass at 25° C. has increased more than 50%. Other materials may be employed in said combination and some of them are vulcanizing agents and accelerators such as "Speedon," "Altax" and "Tuads," antioxidants, such as Aminox, carbon blacks, such as "P-33," "Gastex" etc. The relative quantity of my novel gel to the quantity of said rubbery substance in said combination may vary over wide limits and it is preferred that the ratio be such that the ratio of the quantity of the rubbery substance by weight to the quantity of ethyl cellulose in said gel be between about 50 to 1 and 2 to 1. The ratio of the ethyl cellulose to the products obtained by treating said alkyl abietates in the heretofore described manner is preferably no greater than 1 to 3 and is generally between about 1 to 2 and 1 to 25 by weight in the gels used in these combinations with the rubbery substances. Millable compositions having improved characteristics may be readily and easily produced by mixing a quantity of (a) with a quantity of (b) on a rubber mill which may if desired be maintained at a temperature of about 120° F. during milling. The following general example is illustrative of this phase of the invention.

*Example 17*

A quantity of a gel of the aforesaid (b) class (examples of which are the gels of Examples 7 to 16), was gradually added to a quantity of a rubbery substance of the aforesaid (a) class while the latter was being masticated on a differential speed roll mill, the rolls of which were maintained at a temperature approximately about 120° F. Milling is continued until there is an intimate and substantially uniform admixture of these substances. Then this intimate mixture may be stripped off the rolls as sheets and cured. If desired, a quantity of a vulcanizing agent, accelerator and reinforcing materials as well as other materials used in the compounding of the rubbery material (a) may be added to said mixture and dispersed therethrough on said rubber mill. This product is then sheeted and cured in the usual manner.

This application is a continuation in part of my copending application Ser. No. 522,156 filed February 12, 1944.

Since certain changes in carrying out the above process and certain modifications in the compositions which embody the invention may be made without departing from its scope, it is intended that all matter contained in the above description shall be intepreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

Having thus described my invention, what I claim and desire to protect by Letters Patent is:

1. A gel comprising ethyl cellulose and a product obtained by heating between about 140° F. and 600° F. a mass of an alkyl ester of abietic acid having between 1 to 4 carbon atoms in the alkyl group and while in said heated condition agitating said mass in the presence of a free oxygen containing gas until the viscosity of said mass at 25° C. has increased at least 50%, the ethoxy content of said ethyl cellulose being between 44% and 50%.

2. A gel comprising ethyl cellulose and a product obtained by heating between about 140° F. and 600° F. a mass of methyl abietate and while in said heated condition agitating said mass in the presence of a free oxygen containing gas until the viscosity of said mass at 25° C. has increased at least 50%, the ethoxy content of said ethyl cellulose being between about 44% and 50%.

3. A gel comprising ethyl cellulose and a product obtained by heating between about 140° F. and 600° F. a mass of methyl abietate and while in said heated condition agitating said mass in the presence of a free oxygen containing gas until the viscosity of said mass at 25° C. has increased at least 50%, the ethoxy content of said ethyl cellulose being between about 44% and 50%, and the ratio by weight of the ethyl cellulose to said product being between about 2 to 1 and 1 to 25.

4. The method comprising heating until substantial solution takes place a mixture comprising ethyl cellulose and a product obtained by heating between about 140° F. and 600° F. a mass of an alkyl ester of abietic acid having between 1 to 4 carbon atoms in the alkyl group and while in said heated condition agitating said mass in the presence of a free oxygen containing gas until the viscosity of said mass at 25° C. has increased at least 50% and then cooling said solution approximately to room temperature, the ratio by weight of said ethyl cellulose to said product in said mixture being between about 2 to 1 and about 1 to 25, the ethoxy content of said ethyl cellulose being between 44% and 50%.

MORTIMER T. HARVEY.

REFERENCES CITED

The following references are of record in the file of this patent:

UNITED STATES PATENTS

| Number | Name | Date |
|---|---|---|
| 2,242,729 | Ritchie | May 20, 1941 |
| 1,893,982 | Bradley | Jan. 10, 1933 |
| 1,083,169 | Whipple | Dec. 30, 1913 |